(12) United States Patent
Rousseau et al.

(10) Patent No.: US 12,370,483 B2
(45) Date of Patent: Jul. 29, 2025

(54) TUBULAR FILTER ARRANGEMENT, A FILTER ELEMENT AND USE OF SUCH TUBULAR FILTER ARRANGEMENT

(71) Applicant: Nederman Holding AB, Helsingborg (SE)

(72) Inventors: Daniel Martin Rousseau, Huntersville, NC (US); Ken Jorgensen, Stege (DK)

(73) Assignee: Nederman Holding AB, Helsingborg (SE)

( * ) Notice: Subject to any disclaimer, the term of this patent is extended or adjusted under 35 U.S.C. 154(b) by 529 days.

(21) Appl. No.: 17/597,625

(22) PCT Filed: Oct. 21, 2020

(86) PCT No.: PCT/EP2020/079633
§ 371 (c)(1),
(2) Date: Jan. 14, 2022

(87) PCT Pub. No.: WO2021/089327
PCT Pub. Date: May 14, 2021

(65) Prior Publication Data
US 2022/0347615 A1    Nov. 3, 2022

(30) Foreign Application Priority Data
Nov. 4, 2019   (EP) ..................................... 19206882

(51) Int. Cl.
*B01D 46/24*     (2006.01)
*B01D 46/00*     (2022.01)
*B01D 46/52*     (2006.01)

(52) U.S. Cl.
CPC ...... *B01D 46/2411* (2013.01); *B01D 46/0005* (2013.01); *B01D 46/521* (2013.01); *B01D 2265/06* (2013.01); *B01D 2275/205* (2013.01)

(58) Field of Classification Search
CPC ............ B01D 46/2411; B01D 46/0005; B01D 46/521; B01D 2265/06; B01D 46/71;
(Continued)

(56) References Cited

U.S. PATENT DOCUMENTS 4,257,790 A * 3/1981 Bergquist ........... B01D 46/0005
55/502
4,436,536 A * 3/1984 Robinson ............. B01D 46/521
55/498
(Continued)

FOREIGN PATENT DOCUMENTS

JP          6-170137 A      6/1994
KR    10-2013-0051775 A    5/2013

OTHER PUBLICATIONS

International Search Report and Written Opinion mailed Jan. 18, 2021, in corresponding International Patent Application No. PCT/EP2020/079633, filed Oct. 21, 2020, 12 pages.
(Continued)

*Primary Examiner* — Qianping He
(74) *Attorney, Agent, or Firm* — Christensen O'Connor Johnson Kindness PLLC

(57) ABSTRACT

A tubular filter arrangement (1000) comprising a tubular filter element (100) and a tubular air pulse distributor (300) is provided. The filter element comprises a tubular pleated filter media (106) having an initially circular cross section, and a cage structure (120) and which along an exterior envelope surface thereof is arranged to support the pleated filter media. The exterior envelope surface of the cage structure, defines a first and a second set of two opposing wall portions (123, 124). In a condition when the pleated filter media is arranged to encircle the exterior envelope surface of the cage structure, an inner wall (107) of the pleated filter media is elastically deformed to conform to the exterior envelope surface of the cage structure (120). The
(Continued)

tubular air pulse distributor comprises a locking member (303) configured to allow the tubular air pulse distributor to lockingly engage the tubular filter element.

12 Claims, 14 Drawing Sheets

(58) Field of Classification Search
CPC .............. B01D 2275/205; B01D 46/04; B01D 2201/4084; B01D 2201/4092; B01D 2201/0415; B01D 2201/302; B01D 2201/4046; B01D 35/30; B01D 46/023; B01D 46/4281; B01D 46/72; B01D 2265/026; B01D 2271/022; F02M 26/19
USPC ................ 55/498, 341.1, 378, DIG. 26, 502; 442/200, 201; 210/493.3
See application file for complete search history.

(56) References Cited

U.S. PATENT DOCUMENTS

| | | | |
|---|---|---|---|
| 5,632,791 A | 5/1997 | Oussoren et al. | |
| 5,730,766 A * | 3/1998 | Clements | B01D 46/58 55/377 |
| 2002/0030006 A1* | 3/2002 | Beck | B01D 29/15 210/411 |
| 2008/0092501 A1* | 4/2008 | Sporre | B01D 46/2411 55/497 |
| 2012/0266578 A1 | 10/2012 | Goerg et al. | |
| 2014/0069068 A1* | 3/2014 | Schulz | B01D 46/521 55/486 |

OTHER PUBLICATIONS

Communication mailed Apr. 29, 2020, issued in corresponding EP Application No. 19 206 882.3, filed Nov. 4, 2019, 7 pages.

* cited by examiner ial matter, such as dust particles, from a gaseous fluid flow to thereby provide a clean working environment. A typical application is within metal or wood working industry. The system typically comprises a filter box comprising a housing in which one or more filter elements are arranged. The filter elements may by way of example be in the form of a bag or a hollow tube made of a suitable fabric or pleated material such as a paper or fabric. In use, a gaseous fluid flow, contaminated with particulate matter is directed to pass into the housing via one or more inlets and allowed to leave the housing via one or more outlets. During its passage from the inlet to the outlet, the particulate matter is captured and retained by the one or more filter elements. Over time, a dust cake will be formed on the outer surface of the filter element. As the dust cake is built up, the flow resistance of the filter element will gradually increase. The increase in flow resistance will cause a pressure loss of the fluid flow when passing through the filter element which, in turn, impairs the discharge of the cleaned fluid or requires the use of a more expensive and high-energy suction device. It is preferred that the filters are cleaned on a regular basis to maintain a high performance. The cleaning is typically made by periodically pulsing pressurized air into the interior of the filter elements to dislodge a portion of the dust cake. The dust cake that has been accumulated on the exterior surfaces of the filter elements will be removed by gravity and fall to the ground or into a dust collection device from which it easily may be removed.

The filter element as such has a limited life length and must be changed at a regular basis although the filters are cleaned. This work is cumbersome. The filter element has a certain length which makes it difficult to handle. Especially, many filter boxes are designed in such way that that the filter element is inserted into a through-going hole of the filter support and then the filter support is moved along the longitudinal extension of the filter element to abut and lockingly engage a radially extending shoulder of the filter element. This longitudinal movement involves a risk of damaging the pleated filter media and in the worst case scenario perforates the same. To change filter element, the reversed order is required whereby there is an obvious risk that the accumulated dust will be scraped off by the filter support and fall to the ground but also swirl into the ambient air. Accordingly, there is a need for a new filter design which obviates these problems.

SUMMARY

One object of the present invention is to provide a tubular filter arrangement which may be implemented in housings of existing filter boxes.

The tubular filter arrangement should provide for an improved cleaning by using pulsating pressurized air.

Another object is to provide tubular filter arrangement that allows a simplified mounting and replacement in a filter box.

Yet another object is to provide a tubular filter arrangement which allows a reduced risk of damaging the filter media during handling when exchanging or maintaining the filter arrangement.

Further, another object is to provide a tubular filter arrangement that provides an improved working environment and ergonomics for the personnel.

According to a first aspect, a tubular filter arrangement comprising a tubular filter element and a tubular air pulse distributor is provided, where the tubular filter element comprises a tubular pleated filter media having an initially circular cross section, and a cage structure having a longitudinal extension and which along an exterior envelope surface thereof is arranged to support the pleated filter media, wherein the cage structure as seen in a cross-section transverse to the longitudinal extension thereof comprises an inner envelope surface which defines an inner flow channel of the tubular filter element; and wherein the exterior envelope surface of the cage structure, as seen in a cross-section transverse to the longitudinal extension, defines a first set of two opposing wall portions and a second set of two opposing wall portions, and wherein a first wall portion of the first set of two opposing wall portions merges with the two wall portions of the second set of two opposing wall portions via a respective corner portion, wherein a second wall portion of the first set of two opposing wall portions merges with the two wall portions of the second set of two opposing wall portions via a respective corner portion, wherein each wall portion in the first and second sets of two opposing wall portions has a radius exceeding the radius of the respective corner portions, or has a substantially flat extension, and wherein in a condition when the tubular pleated filter media is arranged to encircle the exterior envelope surface of the cage structure, an inner wall of the pleated filter media is elastically deformed to conform to the exterior envelope surface of the cage structure, whereby the inner wall of the pleated filter media abuts the opposing wall portions of the first and second sets of two opposing wall portions of the cage structure; and the tubular air pulse distributor comprising a locking member and a tube having an exterior longitudinal wall portion extending between a first end of the tube defining an inlet opening and a second end of the tube defining an outlet opening and, wherein the locking member is configured to allow the tubular air pulse distributor to lockingly engage the tubular filter element with the tube being received inside the inner flow channel of the tubular filter element.

Accordingly, a tubular filter arrangement is provided which comprises two main parts, i.e. a tubular filter element and a tubular air pulse distributor. The two parts are configured to lockingly engage each other by means of the locking member of the tubular air pulse distributor. The locking engagement may by way of example be made by hand, simply by twisting the locking member into a locking engagement with a complementary locking member on the tubular filter element. Thus, no separate tooling is required, neither to lock, nor to unlock. In the locked position, the tubular filter arrangement may be handled as one single unit. This facilitates storing, transportation and depending on the design of the filter box, also mounting of the filter arrangement in a filter box.

The tubular filter arrangement may be mounted to a support element, typically being a thin wall, of the filter box. The mounting is made by the support element being clamped between the tubular filter element and the locking member of the tubular air pulse distributor. In such mounting, the tubular filter arrangement will hence be suspended under the support element while secured from above with the locking member. In an alternative embodiment, the tubular filter arrangement may be mounted to a support element of the filter box by the tubular filter arrangement being suspended by clamping to the support element of the filter box.

When the tubular pleated filter media having an initial circular cross section is arranged to encircle the non-circular exterior envelope surface of the cage structure, the inner perimeter of the pleated filter media will be elastically deformed to at least partly conform to the exterior envelope surface of the cage structure. The elastic deformation is allowed by the pleated structure acting as an accordion having an inherent flexibility. In the encircled condition, the inner wall of the pleated filter media, i.e. the radially inner most apexes of the pleats, will be forced to abut the opposing wall portions of the first and second sets of two opposing wall portions of the cage structure and also the respective corner portions of the cage structure. Thus, the pleated filter media will adapt to the cross sectional geometry of the cage structure.

In the context of the invention, it is to be understood that the term radius should not be interpreted as being a strict mathematic radius of a circle, but rather as the radius of a single curved arc. This especially applies to the wall portions in the first and second sets of two opposing wall portions of the cage structure. Thus, broadly speaking, the cross section of the cage structure can be seen as a quadrangular geometry with rounded corners and convex, single curved opposing wall portions. A substantially flat extension of the wall portions in the first and second sets of two opposing wall portions may be provided by the respective wall portions having an infinitely large radius.

Each wall portion in the first and second sets of two opposing wall portions of the cage structure may have a radius exceeding a radius of the pleated filter media as seen in a condition before elastic deformation of the pleated filter media.

Accordingly, the two sets of opposing wall portions of the cage structure may be single curved and have a convex extension in view of the inner flow channel of the tubular filter element. By providing these walls with a radius which exceeds the radius of the pleated filter media, the pleated filter media will slightly expand in the radial direction and hence adapt to the outer curvature of the cage structure when the pleated filter media is wrapped around the cage structure or threaded thereon. Thereby, a close fitting between the pleated filter media and the cage structure will be ensured along the two sets of opposing side walls. Also, a close fitting will result along the corner portions. This close fitting will contribute to the overall robustness of the filter arrangement during handling of the same. The cage structure may hence be seen as a skeleton.

The cage structure preferably comprises a net like structure. The net like structure should be rigid enough to protect and maintain the shape of the filter arrangement, but it must still provide a low air resistance in order to not unduly influencing air flow through the filter arrangement.

In a condition when the tube of the air pulse distributor is received inside the cage structure, a gap is formed along the corner portions of the cage structure, as seen in a direction transverse to the longitudinal extension, between the exterior wall of the tube of the air pulse distributor and the corner portions of the cage structure, said gaps extending as longitudinally extending interspaces along the full length of the air pulse distributor.

The tube of the air pulse distributor preferably has a circular cross section.

When cleaning the filter arrangement by using pulsating pressurized air which is applied to the interior of the filter arrangement, the pressurized air will be allowed to enter these interspaces before leaving the permeable pleated filter media. This results in an enhanced cleaning of the filter arrangement and especially in and around the upper longitudinal portion of the filter arrangement which in prior art filter arrangements is hard to clean by using pulses of pressurized air. The enhanced cleaning allows a prolonged useful lifetime of the filter arrangement and hence reduced costs.

In a condition when the tube of the tubular air pulse distributor is inserted into the inner flow channel of the tubular filter element, a gap may be formed, as seen in a direction transverse to the longitudinal extension, between the exterior wall of the tube of the air pulse distributor and the inner walls of the first set of two opposing wall portions and the second set of two opposing wall portions of the cage structure.

Accordingly, the tube of the tubular air pulse distributor preferably has a diameter which is smaller than or which corresponds to the smallest distance between two opposing wall portions of the cage structure. During operation of the air pulse distributor, a pressure pulse is generated and directed along the longitudinal extension of the filter arrangement. When reaching a closed bottom end of the filter arrangement, the pressure pulse will bounce back in the opposite direction and be allowed to enter the gap before leaving the tubular filter arrangement through the permeable wall of the pleated filter media and thereby release accumulated dust from the pleated filter media.

The tubular filter element may adjacent an inlet opening thereof comprise a radially extending support member, and the locking member of the tubular air pulse distributor may be configured to lockingly engage said support member.

In a condition when the tubular filter arrangement is mounted to a filter support element, typically being a thin wall, of a filter box, the filter support is configured to be arranged in contact with either a top wall portion or a bottom wall portion of the radially extending support member. It is to be understood that the contact may be direct or indirect depending on any intermediate sealing member. In the event of a contact with the top wall portion, the locking member may be arranged to clamp the filter support between the locking member and the radially extending support member. The tubular filter arrangement will hence be suspended on the filter support while resting on the locking member. The support member preferably has an extension past the outer wall of the pleated filter media.

The support member may comprise a longitudinally extending neck portion comprising a locking means configured to lockingly engage a complementary locking means arranged on the locking member of the tubular air pulse distributor The locking member may by way of example be configured to provide a locking engagement by way of screwing, clamping or a snap-fit. It is preferred that the locking engagement is releasable to allow exchange of the filter element when necessary. It is further preferred that the locking means may be operated without the need for any tooling.

The locking member may be integral with the tubular air pulse distributor.

The tubular filter arrangement may be configured to be mounted to a filter support in a filter box by the filter support being clamped between the support member of the tubular filter element and a shoulder of the tubular air pulse distributor.

The filter support in a filter box is typically provided by a thin walled sheet with a plurality of through going holes, each hole being configured to receive a tubular filter arrangement. By the present invention, the tubular filter arrangement may be suspended in the filter support by hanging while resting on the shoulder of the tubular air pulse distributor. It is preferred that the shoulder as seen in at least one direction has a radial extension which exceeds the cross section of the through-going hole in the filter support. The shoulder must not have a rotation symmetric cross section.

The support member of the tubular filter element may comprise a neck portion having a non-rotational symmetric longitudinal extension configured to extend through a complementary through-going hole in a filter support in a filter box.

The cooperation of a non-rotational symmetric neck portion and a complementary receiving hole in a filter support ensures a correct orientation of the tubular filter arrangement when mounted in a filter box. Thereby it is possible to ensure predetermined mutual distances between a plurality of filter arrangements in a filter box. During cleaning, a pressure pulse provided to a first filter arrangement will not only clean that specific filter arrangement, but it will also contribute to the cleaning of adjacent filter arrangements by causing a vibration which removes dust cakes. The removed dust cakes will fall to the ground by gravity. However, if the interspaces are too small there is a risk that dust cakes that are removed from one filter instead are transferred to and are caught on the exterior surfaces of adjacent filters.

The tubular filter arrangement may further comprise a sealing member configured to be arranged in an interface between the support member of the tubular filter element and the filter support.

The purpose of the sealing member is to act as an air sealing that prevents dirty, non-filtered air from escaping into the clean air zone of the housing.

The sealing member may be a separate member or integral with the support member. It is to be understood that also the tubular air pulse distributor may be provided with a sealing member.

The tubular filter arrangement may be configured to be mounted to a filter support in a filter box by the support member of the tubular filter element filter being clamped between the filter support and a frame element.

The clamping may be made by e.g. bolting or clamps. The frame element may by way of example be provided as a metal plate which is configured to be arranged on top of the tubular filter arrangement and in engagement with either the support member of the tubular filter element and/or with the tubular air pulse distributor, such as with the shoulder or the locking member. The purpose is to force the tubular filter arrangement towards the filter support in the filter box and prevent any movements of the filter arrangement during operation of the filter box and especially during cleaning of the filter element. At the same time the sealing member which is arranged on a lower surface of the support member will be compressed to thereby prevent dirty, non-filtered air from escaping into the clean air zone of the housing.

The pleated filter media may have a uniform pleat height. Thereby the air resistance through the filter media will substantially be the same along the full perimeter.

The tube of the tubular air pulse distributor may have a circular cross section.

According to another aspect, a filter element to be used in a tubular filter arrangement is provided. The filter element comprises a pleated filter media and a cage structure having a longitudinal extension and which along an exterior envelope surface thereof is arranged to support the pleated filter media, wherein the cage structure as seen in a cross-section transverse to the longitudinal extension thereof comprises an inner envelope surface which defines an inner flow channel; and wherein the exterior envelope surface of the cage structure, as seen in a cross-section transverse to the longitudinal extension, defines a first set of two opposing wall portions and a second set of two opposing wall portions, and wherein a first wall portion of the first set of two opposing wall portions merges with the two wall portions of the second set of two opposing wall portions via a respective corner portion, wherein a second wall portion of the first set of two opposing wall portions merges with the two wall portions of the second set of two opposing wall portions via a respective corner portion, wherein each wall portion in the first and second sets of two opposing wall portions has a radius exceeding the radius of the respective corner portions, or has a substantially flat extension, wherein in a condition when the pleated filter media is arranged to encircle the exterior envelope surface of the cage structure, an inner wall of the pleated filter media is elastically deformed to conform to the exterior envelope surface of the cage structure, whereby the inner wall of the pleated filter media abuts the opposing wall portions of the first and second sets of two opposing wall portions of the cage structure, and wherein each wall portion in the first and second sets of two opposing wall portions have a radius exceeding a radius of the pleated filter media as seen in a condition before elastic deformation of the pleated filter media.

The filter element as such and advantages provided thereby have been thoroughly discussed above in view of a tubular filter arrangement comprising such filter element as an integral art thereof. To avoid undue repetition, reference is made to that discussion. The filter element may be provided as a spare part to be combined with an air pulse distributor and a locking member to thereby form part of a tubular filter arrangement.

According to yet another aspect, the invention refers to the use of a tubular filter arrangement according to any of claims 1-12 in a filter box.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1:
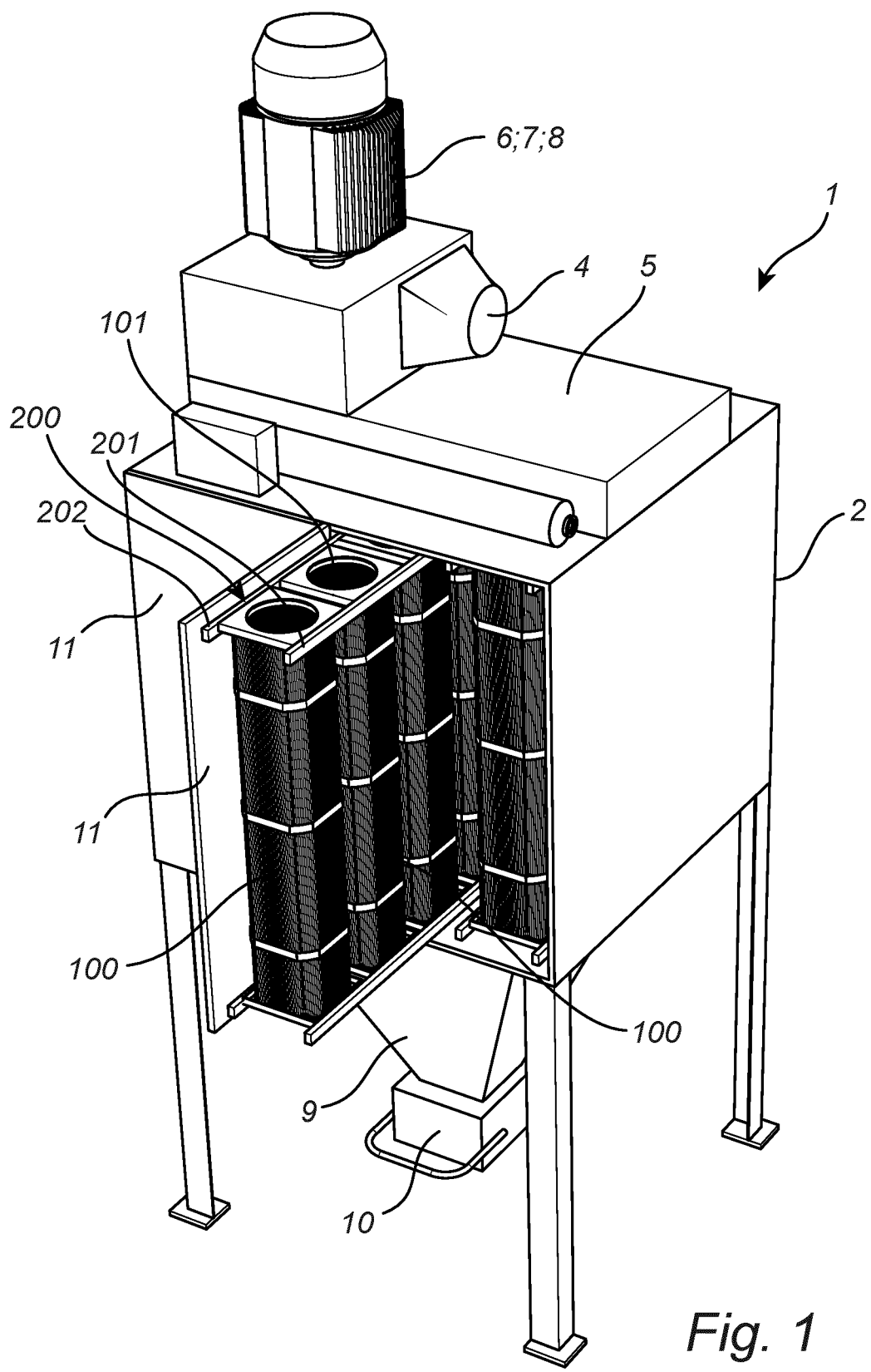
FIG. 1 discloses one embodiment of a filter box of a filter system.
Figure 2:
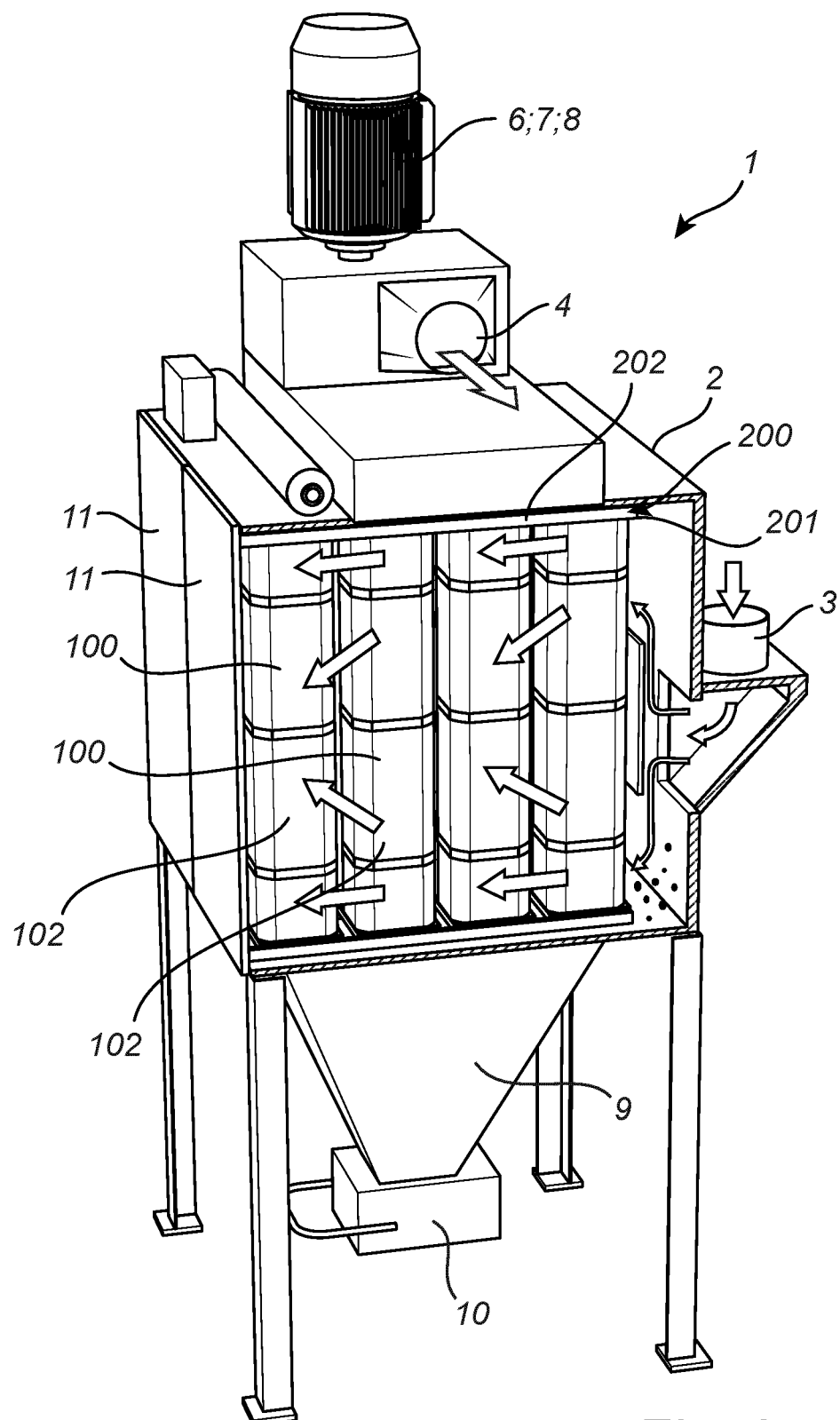
FIG. 2 schematically discloses the air flow through the filter box.

Now turning to FIGS. 1 and 2 one embodiment of a filter box 1 and the air flow therethrough is schematically disclosed. To facilitate understanding, the pleats of the tubular filter elements have been omitted in FIG. 2.

The filter box 1 comprises a housing 2 having an inlet 3 and an outlet 4. The inlet 3 is arranged on a rear side wall of the housing 2 whereas the outlet 4 is arranged on the top wall 5. It is to be understood that other positions of the inlet 3 and outlet 4 are possible within the scope of the invention. A suction source 6 in the form of a fan 7 with an accompanying motor 8 is arranged adjacent the outlet 4. The lower part of the housing 2 merges via a funnel 9 with a dust collection device 10. In the disclosed embodiment one of the vertical side walls of the housing 2 comprises two openable doors 11 allowing access to the interior of the housing 2.

As is highly schematically disclosed, the housing 2 is configured to support at least one, and preferably a plurality of tubular filter elements 100. In the disclosed embodiment the tubular filter elements 100 are vertically arranged by means of a support arrangement 200 in the form of a tray-like filter support 201 which is suspended on horizontal rails 202. Thereby the filter support 201 may easily be pulled out from the housing 2 to allow inspection or change of the tubular filter elements 100. One of the filter supports 201 is shown in its pulled out position.

In the disclosed embodiment, each filter support 201 supports four tubular filter elements 100 which are arranged side by side. Each tubular filter element 100 has an inner flow channel 101. Each filter support 201 may support one or more tubular filter elements 100. It is to be understood that the number of tubular filter elements 100 may be altered within the scope of the invention. It is also to be understood that the support arrangement 200 with remained function may be arranged to suspend the tubular filter elements 100 in other directions, such as in a horizontal direction.

In operation, see FIG. 2, a dust-laden gaseous fluid flow is introduced to the housing 2 via the inlet 3. The dust-laden gaseous fluid flow will be distributed inside the housing 2 in interspaces which are formed between the exterior surfaces 102 of the respective tubular filter elements 100. As a result of the inner flow channels 101 of the respective tubular filter elements 100 being connected to the suction source 6 via the outlet 4, the gaseous fluid will be sucked into the inner flow channels 101 and be emitted from the housing 2 via the outlet 4 while particulate matter contained in the gaseous fluid will be separated by the exterior surfaces 102 of the tubular filter elements 100.

The tubular filter elements 100 may be cleaned on a regular basis, e.g. by a non-disclosed cleaning system using jet pulses of pressurized air. Pulses of pressurized air are directed from the interior of the tubular filter elements 100 whereby dust cakes accumulated over time on the exterior surfaces 102 of the tubular filter elements 100 will be removed and fall by gravity into the dust collecting device 10.

Figure 3:
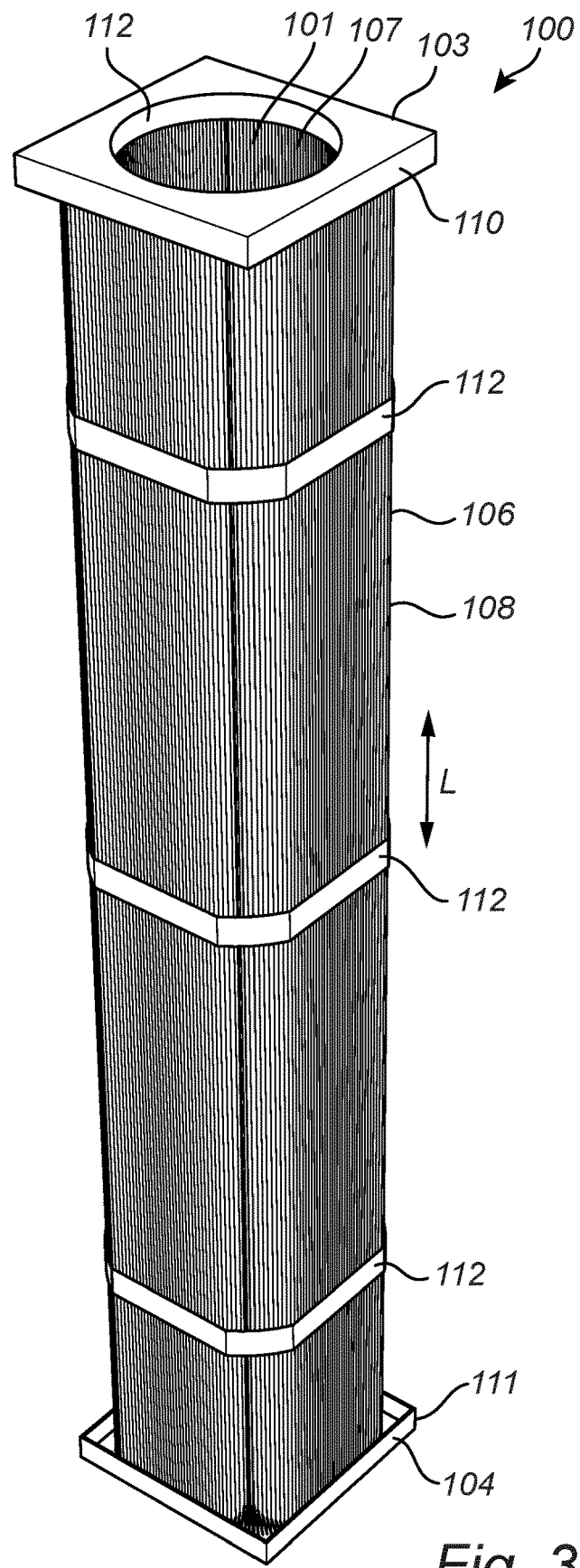
FIG. 3 schematically discloses a perspective view of a tubular filter element according to the invention.

Now turning to FIGS. 3, 4A-4B and 5 the overall design of a tubular filter element 100 is disclosed. As is best seen in FIG. 3, the tubular filter element 100 has a generally longitudinal extension L and comprises a first end 103 and a second end 104. The disclosed tubular filter element 100 is intended to be vertically mounted, whereby the first end 103 during use is configured to constitute an upper end, and the second end 104 is configured to constitute a lower end. In case of a vertical orientation, the first end 103 is typically connected to the outlet 4 of the housing 2, thereby being in communication with the suction source 6. Accordingly, the first end 103 in that aspect constitutes a primary outlet end.

Figure 4A:
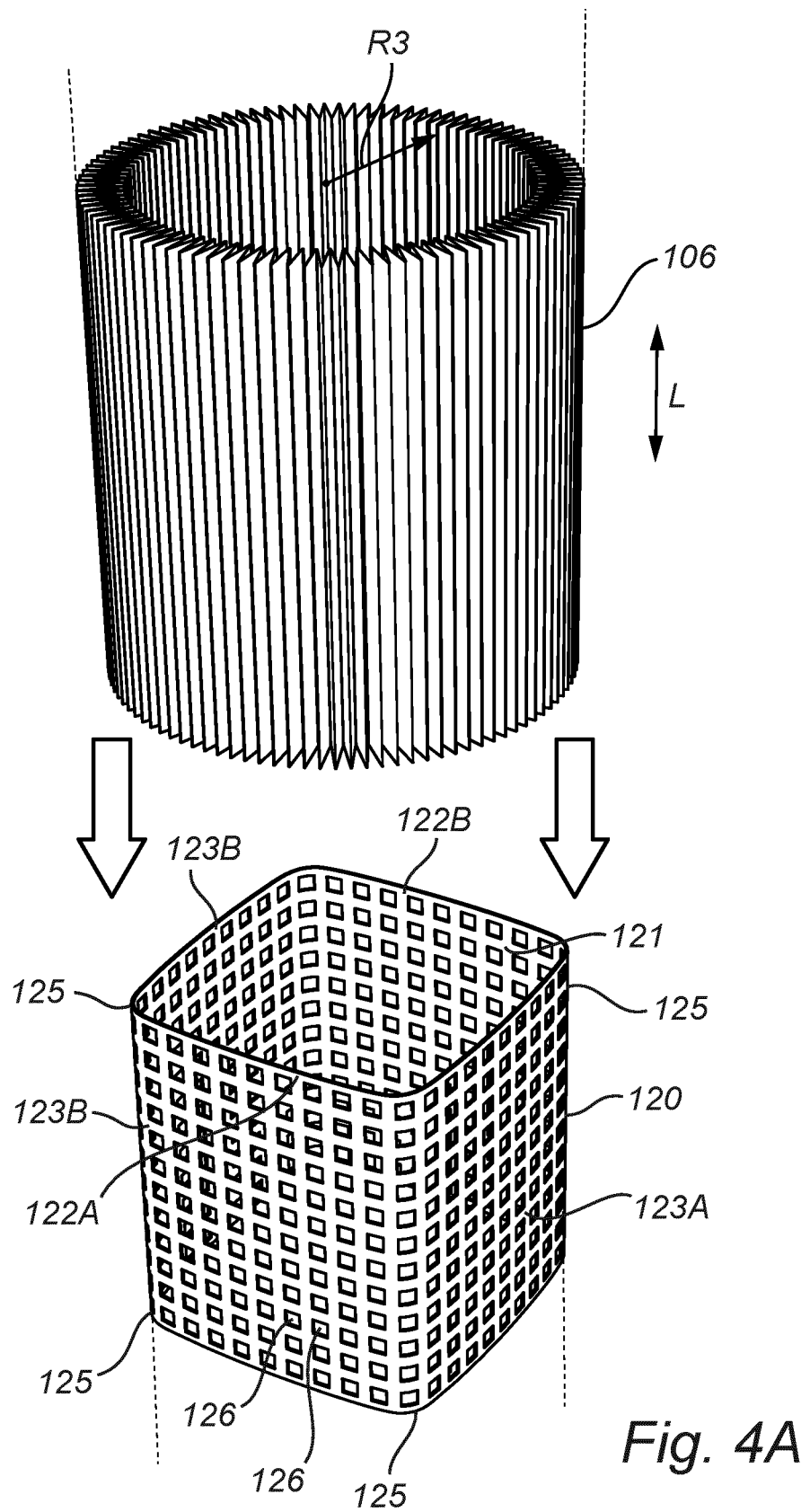
FIGS. 4A and 4B disclose the combination of a pleated filter media and a cage structure.

The tubular filter element 100 has a longitudinal inner wall 107 and outer wall 108 which are formed by apexes of a pleated filter media 106. The inner wall 107 defines at least partly the inner flow channel 101 of the tubular filter element 100. The pleated filter media 106 may be made of a permeable filter substance such as a filter membrane or a filter fleece. As is best seen in FIG. 4A, the pleated filter media 106 has an initially inherent circular cross section. The circular cross section may be provided e.g. by wrapping a pleated sheet. The pleated filter media 106 has a uniform pleat height. The pleated filter media 106 may include pleat separators (not disclosed) present between the pleats.

Now turning to FIG. 3 anew. The tubular filter element 100 comprises in its first end 103 a radially extending support member 110. The support member 110 is configured to facilitate suspension of the tubular filter element 100 in the filter support 201, see FIG. 1. Further, the tubular filter element 100 comprises a bottom member 111. The bottom member 111 is configured to form a closed end of the pleated filter media 106. The support member 110 and the bottom member 111 are both highly schematically disclosed in FIG. 3. The support member 110 and the bottom member 111 each contributes to maintaining the shape of the tubular filter element 100 during handling. To further maintain the shape of the pleated filter media 106, the tubular filter element 100 may be provided with one or more circumferentially extending straps 112 or the like. The number of straps 112, their design and position may be altered within the scope of the invention. The straps may even be omitted.

The radially extending support member 110 comprises a through-going opening 112 extending concentrically with the longitudinal extension L of the tubular filter element 100. The opening 112 is configured to receive a tube 301 of a tubular air pulse distributor 300 to be described below.

As is best seen in FIGS. 4A, 4B, 5, 6 and 8, the tubular filter element 100 further comprises a cage structure 120 which extends concentrically inside the pleated filter media 106. The cage structure 120 is omitted in FIG. 3. The cage structure 120 comprises, as seen in a cross-section transverse to the longitudinal extension L, an envelope surface 121 which at least partly defines the inner flow channel 101.

Figure 5:
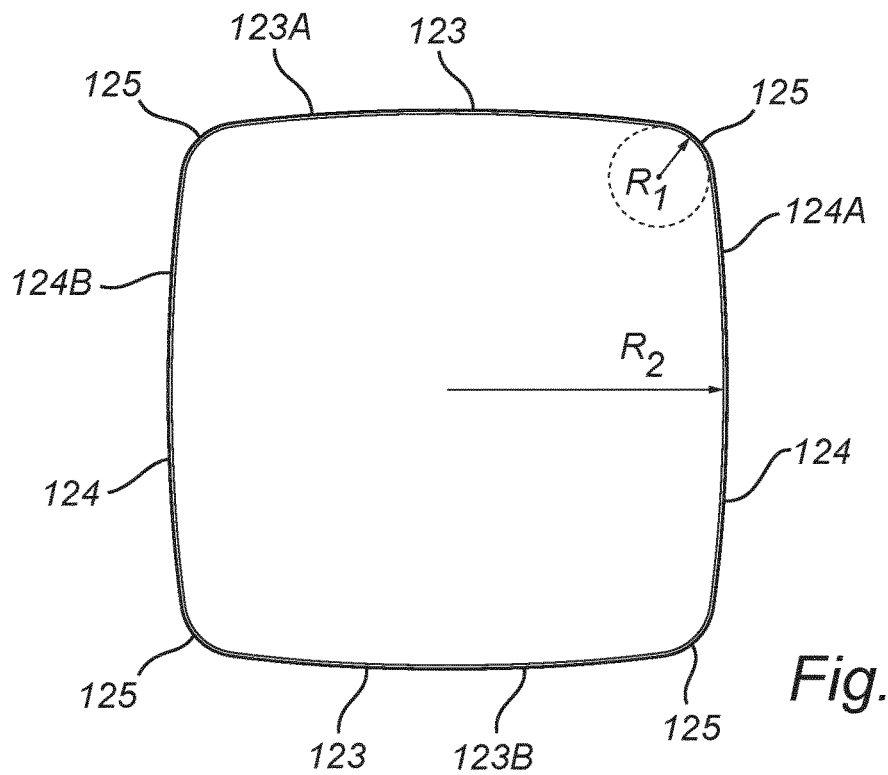
FIG. 5 is a schematic cross section of the cage structure.

The envelope surface 121 of the cage structure 120, see FIG. 5, defines as seen in a cross-section transverse to the longitudinal extension L, a first set of two opposing wall portions 123 and a second set of two opposing wall portions 124. A first wall portion 123A of the first set of two opposing wall portions 123 merges with the two wall portions 124A, 124B of the second set of two opposing wall portions 124 via a respective corner portion 125. A second wall portion 123B of the first set of two opposing wall portions 123 merges with the two wall portions 124A; 124B of the second set of two opposing wall portions 124 via a respective corner portion 125.

Each wall portion 123A; 123B; 124A, 124B in the first and second sets of opposing wall portions 123, 124 have a radius R2 exceeding a radius R1 of the respective corner portions 125. Accordingly, broadly speaking, the cross section of the cage structure can be seen as a quadrangular geometry with rounded corners and convex, single curved opposing wall portions.

The radius R2 of each wall portion 123A; 123B; 124A, 124B in the first and second sets of opposing wall portions 123, 124 exceeds a radius R3 of the pleated filter media 106 as seen in a condition before elastic deformation of the pleated filter media 106.

The wall portions 123A; 123B; 124A, 124B; 125 of the cage structure 120 are provided as a net-like structure to provide as low fluid resistance as possible in a direction transverse the longitudinal extension L. The pattern of the net-like structure may be varied. The purpose of the cage structure 120 is to provide rigidity to the tubular filter element 100 during handling. The cage structure 120 may by way of example be formed by plastic or metal.

Figure 4B:
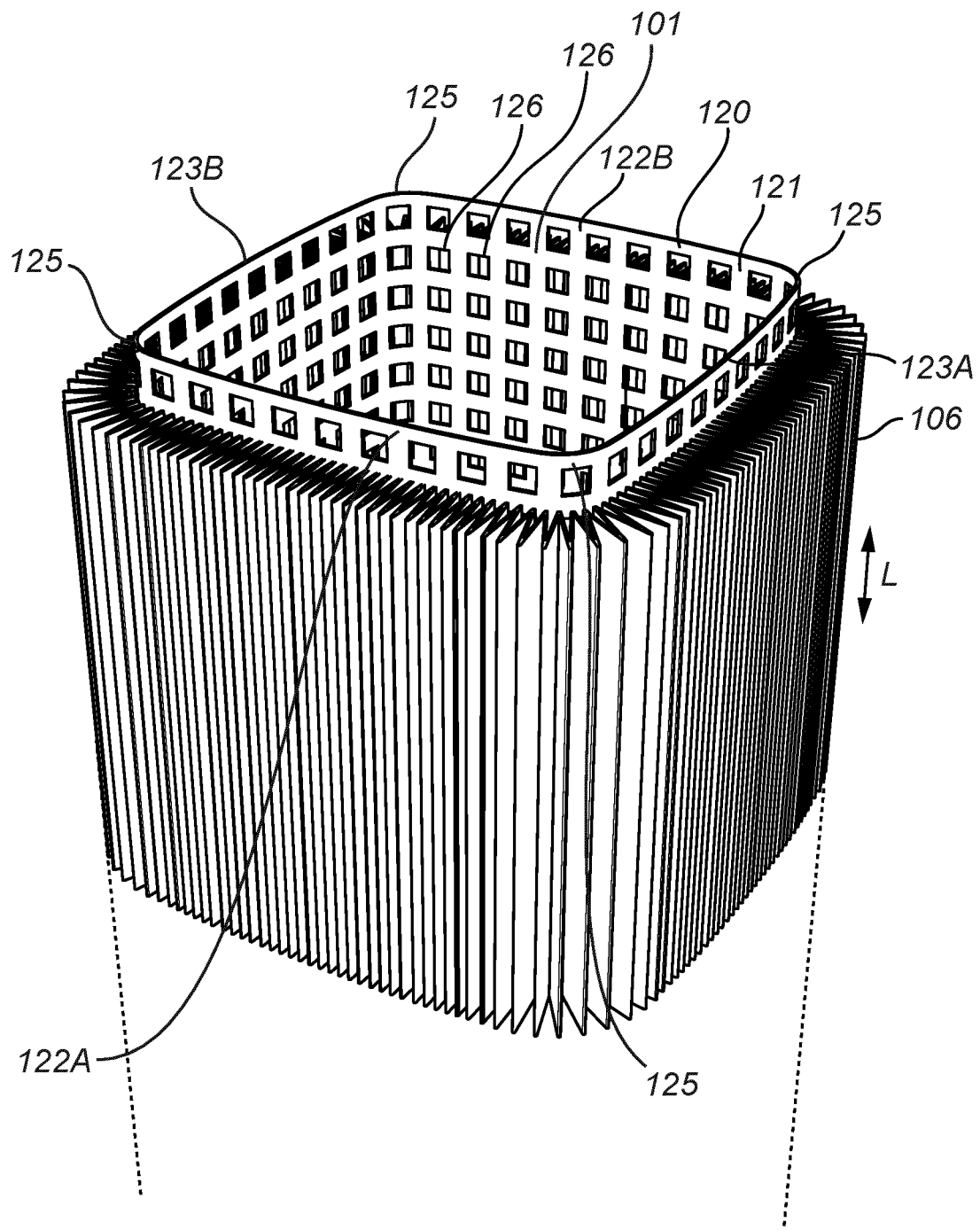

As is best seen in FIGS. 4A and 4B, the pleated filter media 106 is threaded over the cage structure 120, whereby the cage structure 120 is arranged to extend along the inner wall 107 of the pleated filter media 106. Alternatively, the pleated filter media 106 may be wrapped around the cage structure 120. No matter threading or wrapping, when the pleated filter media 106 is arranged to encircle the exterior envelope surface of the cage structure 120, the inner wall 107 of the pleated filter media 106 is elastically deformed to at least partly conform to the exterior envelope surface of the cage structure 120. As a result thereof, the inner wall 107 of the pleated filter media 106 abuts the opposing wall portions 123A; 123B; 124A, 124B of each of the first and second sets of opposing wall portions 123, 124 of the cage structure 120 and also the corner portions 125.

Figure 6:
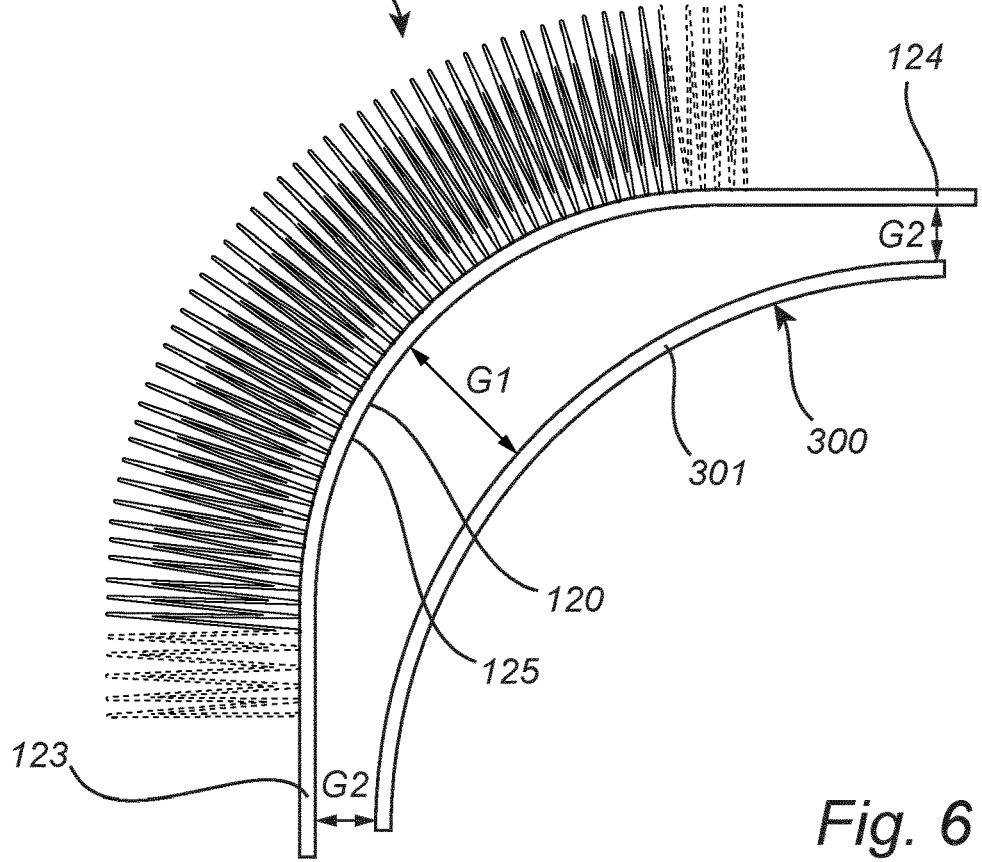
FIG. 6 is a schematic cross section of a corner portion of the combination of the pleated filter media and the cage structure.

Turning to FIG. 6, a cross section of a corner portion of the tubular filter element 100 is illustrated as seen in a condition when the pleated filter media 106 is arranged to encircle the cage structure 120 and has been elastically deformed thereto. Further, the tube 301 of the air pulse distributor 300 has been inserted into the cage structure 120.

As a consequence of the tube 301 of the air pulse distributor 300 having a circular cross section being received inside the cage structure 120 having a non-circular cross section, a gap G1 is formed adjacent the corner portions 125 of the cage structure 120, as seen in a direction transverse to the longitudinal extension. The gap G1 is formed between the exterior wall of the tube 301 of the air pulse distributor 300 and the corner portions 125 of the cage structure 120. The gaps G1 extend as longitudinally extending interspaces along the respective corner portions 125 and along the full length of the air pulse distributor 301.

The gap G1 is substantially larger than any gap G2 that may be formed between the tube 301 and the cage structure 120 along the two sets of opposing wall portions 123, 124. The effect of the gap G1 will be discussed below.

Figure 7:
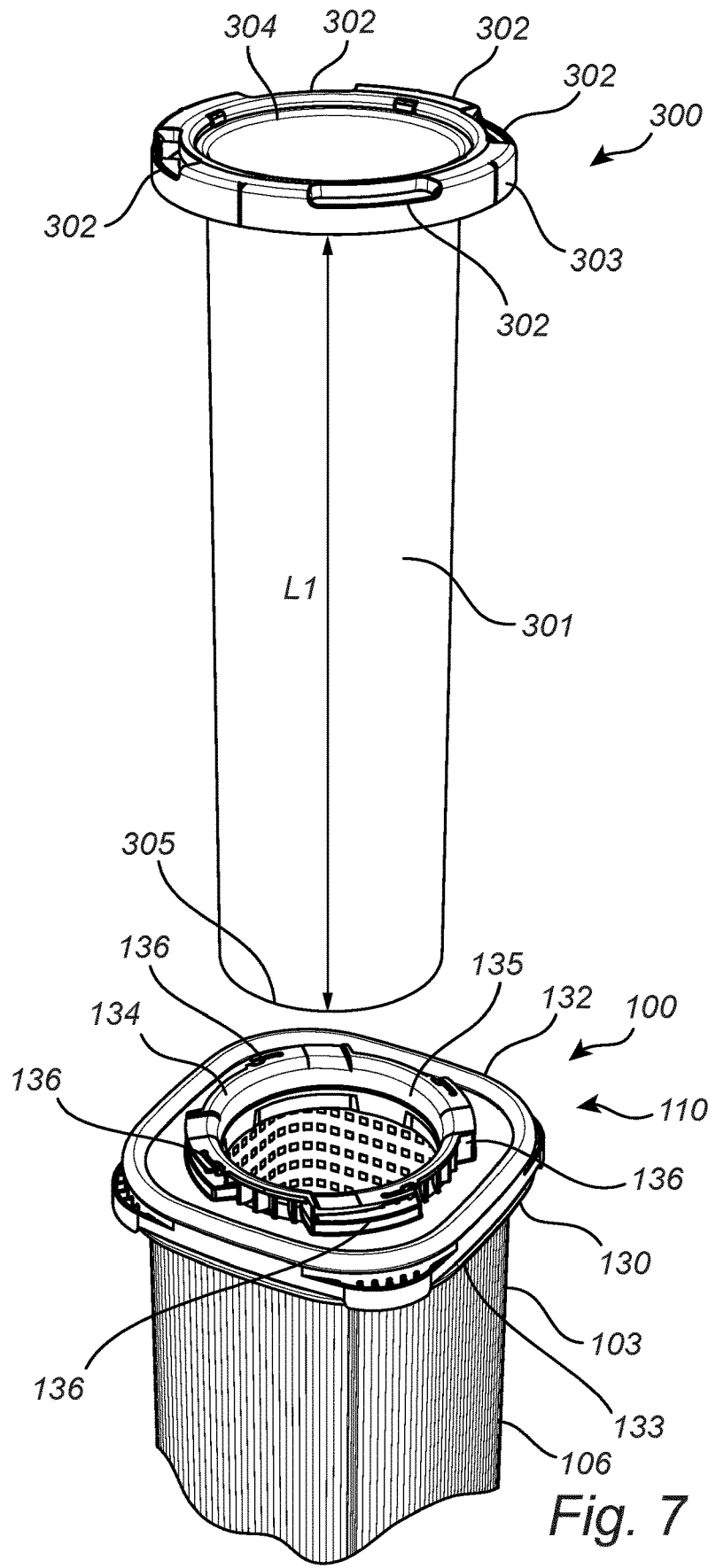
FIG. 7. is a schematic exploded view of the tubular filter arrangement comprising a tubular filter element and a tubular air pulse distributor.

Now turning to FIG. 7, the details of the radially extending support member 110 are disclosed. The support member 110 is arranged in the first end 103 of the tubular filter element 100. The support member 110 is configured to facilitate suspension of the tubular filter element 100 in the filter support 201.

The support member 110 comprises a lower surface 130 facing the pleated filter media 106 and an upper surface 131 facing away from the pleated filter media 106. The support member 110 comprises a first sealing member 132 extending along an edge portion of the upper surface 131 of the support member 110. The support member 110 further comprises a second sealing member 133 extending along an edge portion of the lower surface 130 of the support member 110. The first and second sealing members 132, 133 may be integral with the support member 110 or be provided as standalone sealing members.

A longitudinally extending neck portion 134 is arranged on the upper surface 131. The neck portion 134 delimits a through-going opening 135 that is concentric with the inner flow channel 101.

The longitudinally extending neck portion 134 comprises a locking means 136 configured to lockingly engage a complementary locking means 302 arranged on a locking member 303 of a tubular air pulse distributor 300 to be described below. The embodiment disclosed in FIG. 7 discloses a locking system with four locking means 136; 302 which are circumferentially distributed. It is to be understood that the number and position maybe altered within the scope of the invention.

The neck portion 134 is provided with a non-circular cross section. The non-circular cross section is configured to ensure that the tubular filter element 100 is arranged in a pre-determined position when mounted to the filter support 201.

FIG. 7 further discloses one embodiment of the tubular air pulse distributor 300. The tubular air pulse distributor 300 comprises a tube 301 having an exterior longitudinal wall portion extending between a first end 304 and a second end 305. The length L of the tubular filter element 100 exceeds the length L1 of the tube 301. The tube 301 has a circular cross section, although it is to be understood that other cross sections are possible.

Figure 8:
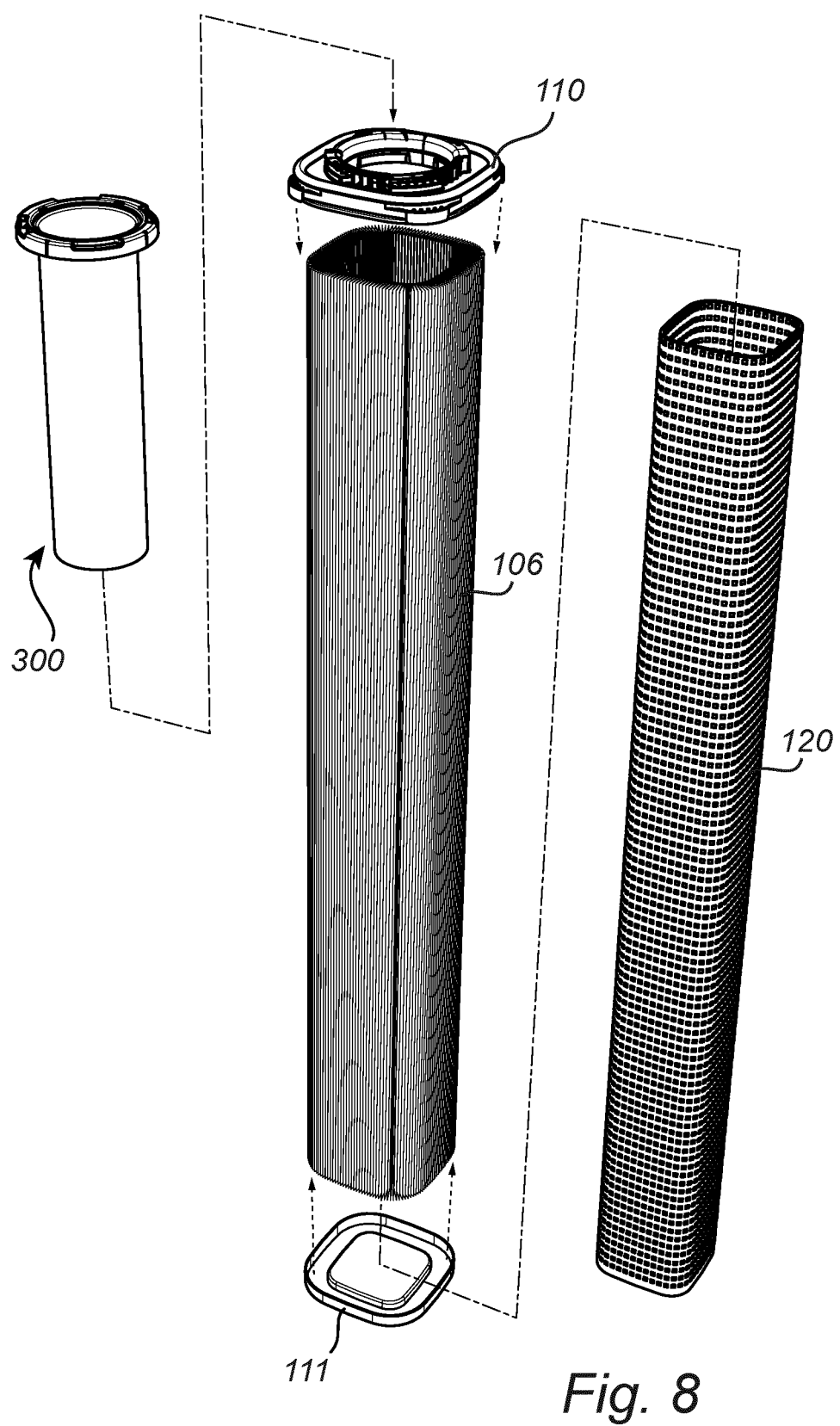
FIG. 8. is an exploded view of the tubular filter arrangement.

To better understand the arrangement, FIG. 8 discloses an exploded view of the tubular filter arrangement 1000 and its components, i.e. the tubular air pulse distributor 300 and the tubular filter element 100 with its support member 110, pleated filter media 106, bottom member 111 and cage structure 120.

Figure 9:
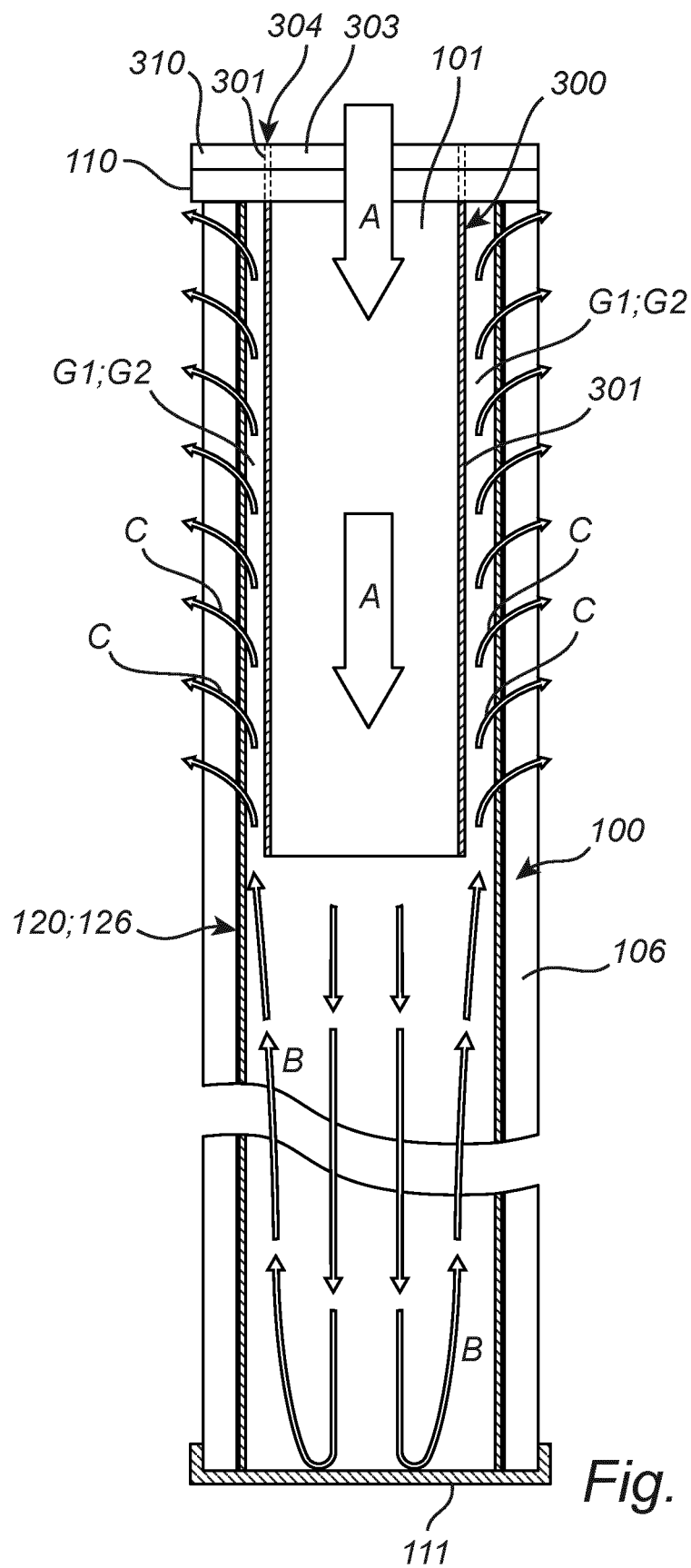
FIGS. 9 and 10 schematically discloses cleaning of the tubular filter media.
Figure 10:
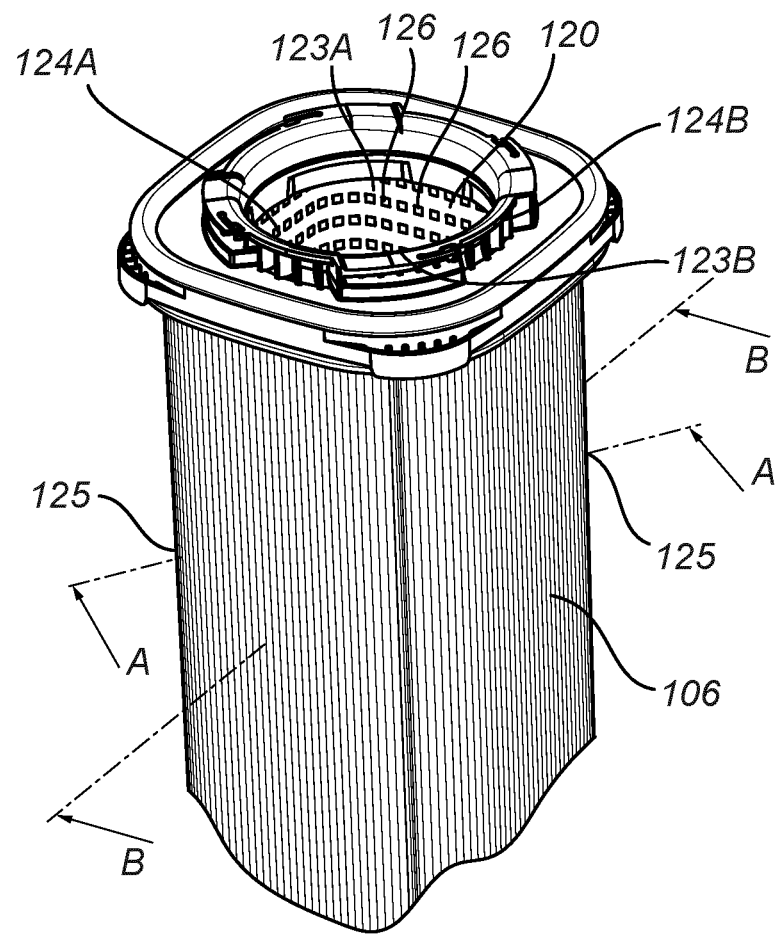
Figure 10:
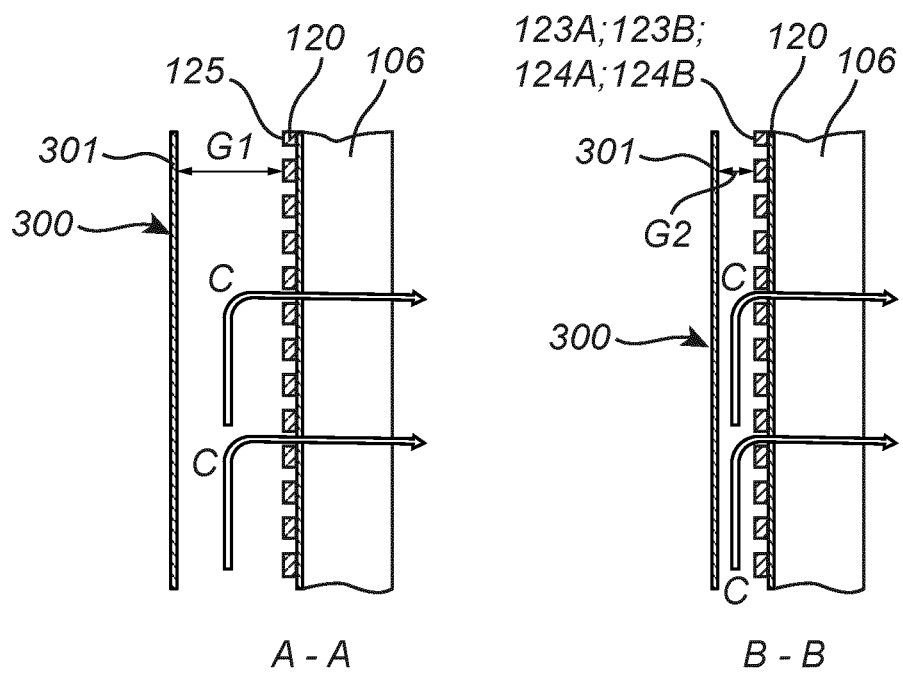

As is schematically illustrated in FIGS. 9 and 10, the tubular air pulse distributor 300 is configured to be lockingly engaged to the tubular filter element 100 with the tube 301 being received inside the inner flow channel 101. The locking engagement is allowed by the first end 304 of the tube 301 comprising a shoulder 310 with a locking member 303. The locking member 303 is configured to lockingly engage the tubular air pulse distributor 300 to the tubular filter element 100 by locking means (omitted in FIG. 9) lockingly engaging a complementary locking means on the support member 110 of the tubular filter element 100.

In order to clean the pleated filter media 106, an inflow of pressurized air (arrow A) is directed in the longitudinal direction L into the tubular air pulse distributor 300 via its inlet opening. The pressurized air may be provided as a pulsating flow. The pressurized air is provided via a non-disclosed pressure source. The pressurized air will cause an overall vibration of the tubular filter arrangement 1000 which will contribute to removal of dust that has been accumulated on the pleated filter media 106 over time. As the flow of pressurized air meets the bottom member 111 which forms a closed end, the air will change direction and form a return flow (arrows B) in the opposite direction.

The return flow B will however have slightly less energy than the inflow A, whereby the return flow B to a substantial degree will escape into the longitudinally extending interspace between the exterior wall of the tube 301 of the tubular air pulse distributor 300 and the inner wall of the cage structure 120. From there, it will escape in the radial direction through the through-going openings 126 in the wall of the cage structure 120 and further through the fluid permeable wall of the pleated filter media 106. The air in the interspace may basically take two main routes through the pleated filter media 106. The two main routes will be described below with reference to cross sections A-A and B-B respectively.

Cross section A-A in FIG. 10 is taken between two diametrically opposing corner portions 125 of the cage structure 120. In this area there is formed the gap G1 between the exterior wall of the tube 301 of the air pulse distributor 300 and the inner wall of the corner portions 125 of the cage structure 120. The gap G1 has previously been discussed in view of FIG. 6 and forms a longitudinally extending interspace which extends along the full length of the tube 301 of the air pulse distributor 300. The portion of the pressurized air C travelling along this interspace will allow a better utilization of the momentum in the return flow B, which results in an enhanced vibration and hence cleaning of the pleated filter media 106 along the corner portions 125. The enhanced cleaning will prevail along the longitudinal extension of the interspace.

This should be compared to cross section B-B taken between two wall portions 123A; 123B; 124A; 124B in a set of two opposing wall portions 123; 124 of the cage structure 120. In this cross section, the gap G2 between the exterior wall of the tube 301 of the air pulse distributor 300 and the inner wall of the cage structure 120 is substantially smaller than the gap G1 in the corner portion 125 which is referred to in cross section A-A. In fact, the gap G2 may not even exist if the radius of the tube 301 corresponds to the radius R2 of the cage structure 120. This will result in a cleaning of the pleated filter media 106, but the level of vibration of the pleated filter media 106 will be lower than in cross section A-A.

Accordingly, by the present invention, the cleaning effect is improved by the return flow B being allowed to escape in and along the enlarged interspace that is formed between the exterior wall of the tube 301 of the air pulse distributor 300 and the inner wall of the corner portions 125 of the cage structure 120. Thereby an improved cleaning of the pleated filter media 106 along its full longitudinal extension is provided for.

Figure 11A:
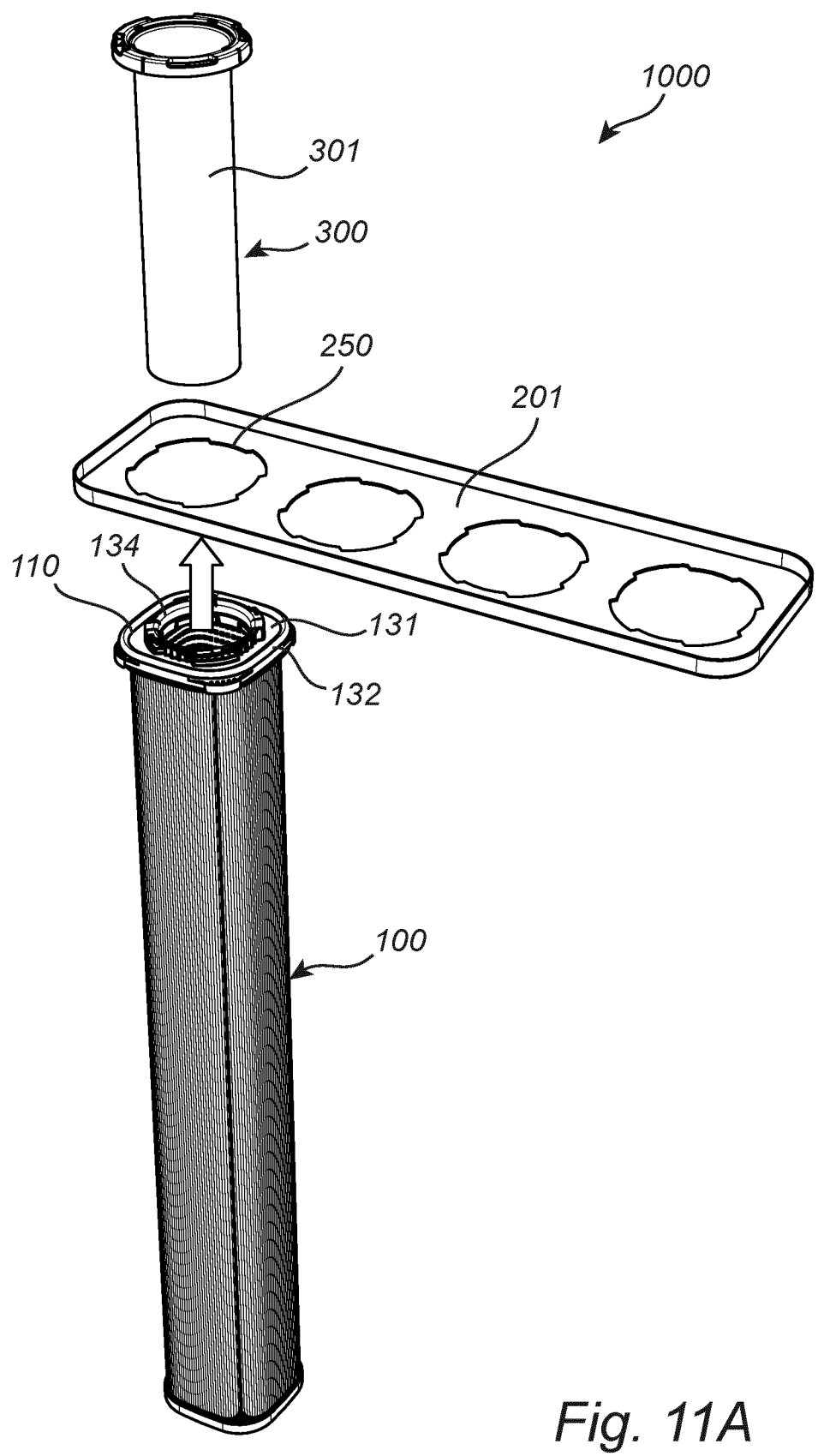
FIGS. 11A-11C discloses a first embodiment of the mounting of the tubular filter arrangement to a filter support.
Figure 11B:
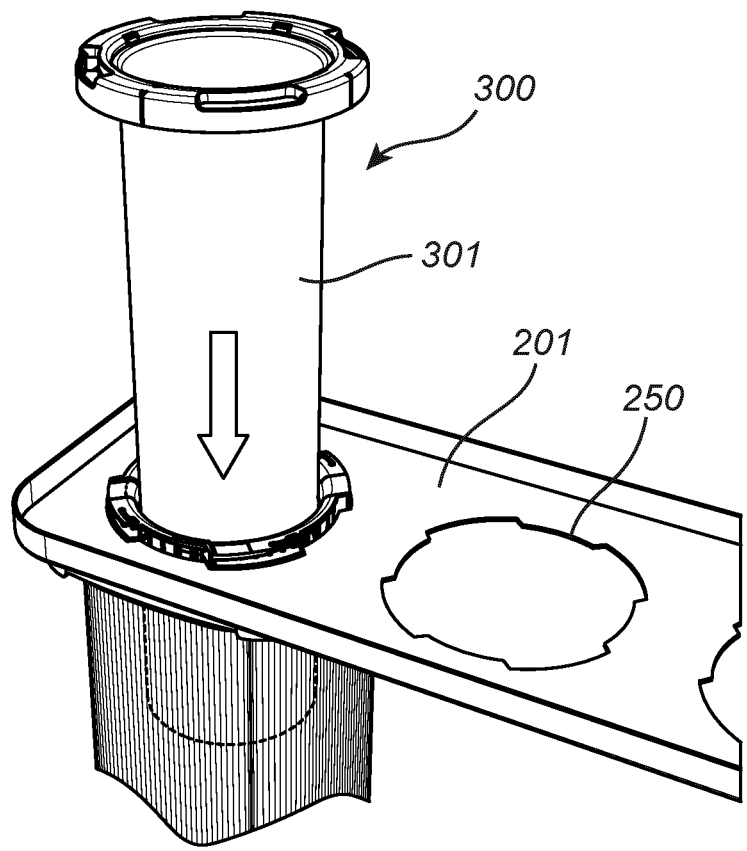
Figure 11C:
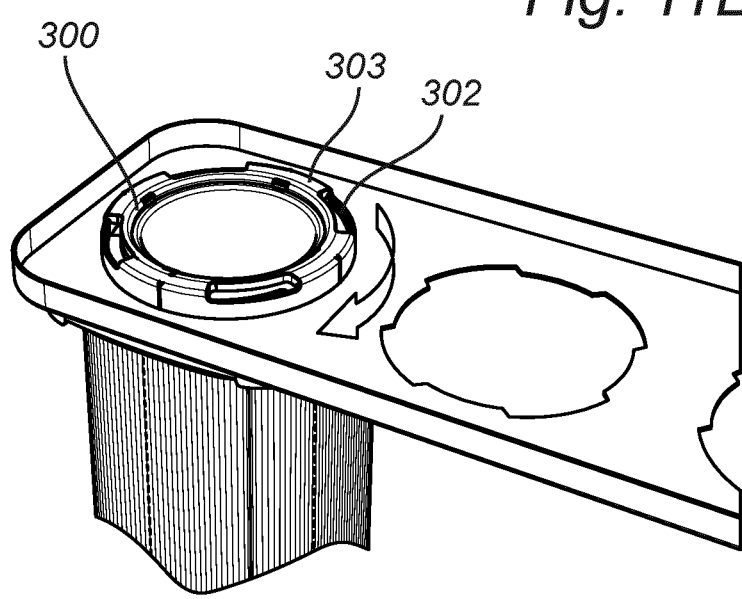

Now turning to FIG. 11A-11C, a first way of mounting a tubular filter arrangement 1000 to a filter support 201 is schematically disclosed. The filter support 201 is configured to be arranged in a filter box 1 in a manner that is schematically disclosed in FIG. 1. The filter support 201 is typically in the form of a thin-walled tray with one through-going hole 250 per filter arrangement 1000.

During mounting, the tubular filter element 100 is arranged in a vertical position resting on e.g. the floor. The filter support 201 is arranged on top of the support member 110 with the neck portion 134 extending through the through-going opening 250 in the filter support 201. The filter support 201 will thereby rest on the first sealing member 132 on the upper surface 131 of the support member 110.

It is preferred that the through-going hole 250 in the filter support 201 is non-circular. It is also to be preferred that the neck portion 134 of the support member 110 at least along a longitudinal portion thereof has the complementary geometry. A non-circular cross section results in that the plurality of filter arrangements 1000 will be arranged side by side in a determined pattern in the filter box 1.

To lock the tubular filter element 100 to the filter support 201, the tube 301 of the tubular air pulse distributor 300 is inserted from above, see FIG. 11B, to thereby extend concentrically with the tubular filter element 100. In the inserted position, the tubular air pulse distributor 300 is twisted, see FIG. 11C, by gripping the locking member 303 whereby the locking means 302 will lockingly engage the complementary locking means 136 on the neck portion 134 of the support member 110. The locking engagement is preferably provided by a wedge action, whereby a close fitting is provided between the first sealing member 132 and the filter support 201. Thereby an air sealing is provided in the interface between the tubular filter element 100 and the filter support 201. This promotes that the air from pressurized air pulses escapes through the pleated filter media 106 rather than through any gaps between the structural components.

One advantage with this embodiment is that the filter support 201 will not come in contact with the pleated filter media 106, neither during mounting, nor during exchange. Thereby there is no risk of damaging the pleated filter media 106 or that the filter support 201 comes in contact with dust cakes which over time accumulate on the exterior surface of the pleated filter media 106. This should be compared to prior art solutions where the tubular filter element typically is inserted into and passed through the hole 250 in the filter support 201 both during mounting and during exchange.

It is to be understood that the sealing member may be a separate member or integral with the support member 110 and that also the tubular air pulse distributor may be provided with a sealing member.

It is further to be understood that the locking member may be configured to lockingly engage the support element in a number of ways. The locking engagement may by way of example be configured to be provided by screwing, clamping or a snap-fit. It is preferred that the locking engagement is releasable to allow exchange of the filter element when necessary. It is further preferred that the locking means may be operated without the need for any tooling.

FIG. 11A discloses an embodiment of a filter support 201 which is designed to receive four filter arrangements. It is to be understood that the number of filter arrangements may differ depending on the size and design of the filter box 1.

Figure 12A:
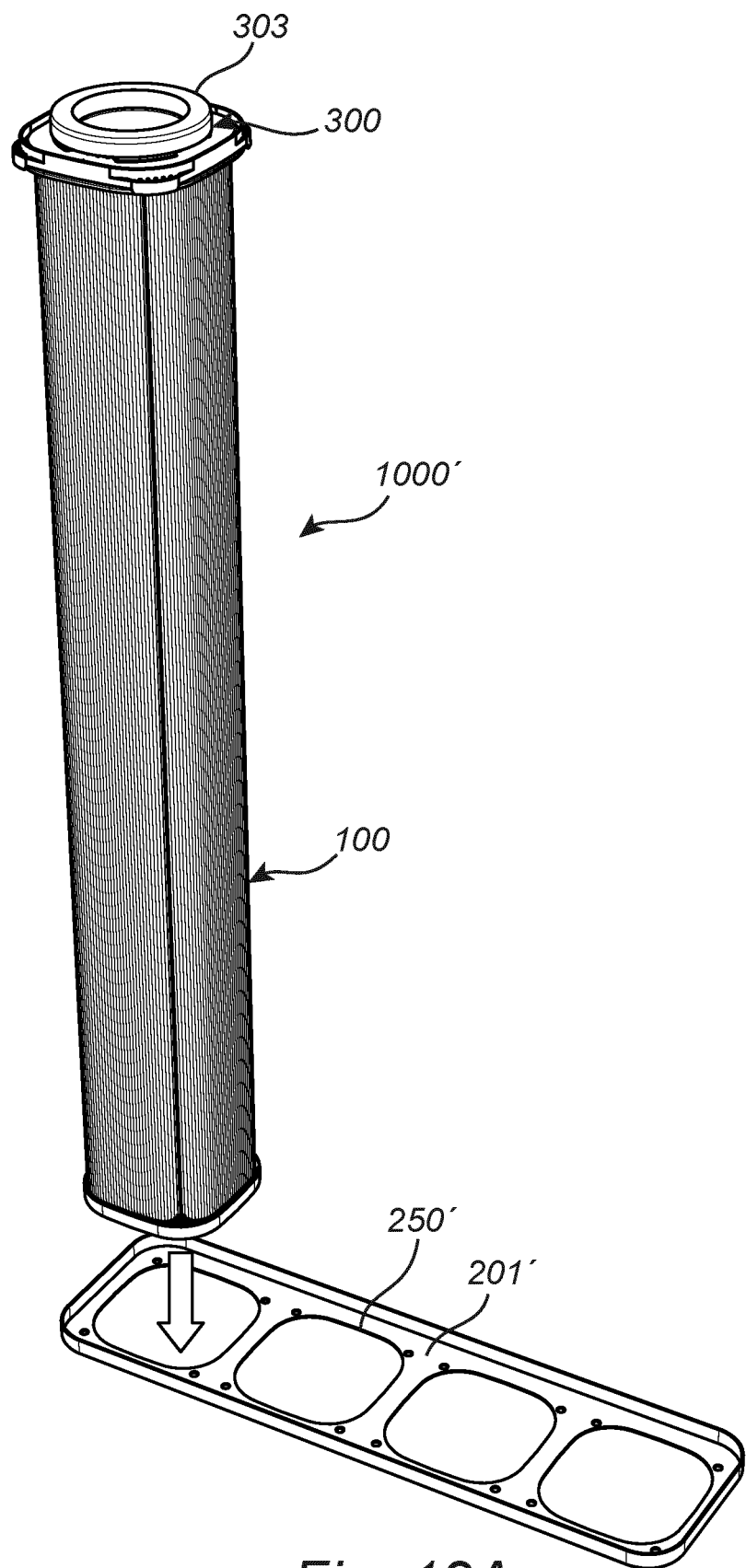
FIGS. 12A-12C discloses a second embodiment of the mounting of the tubular filter arrangement to a filter support.
Figure 12B:
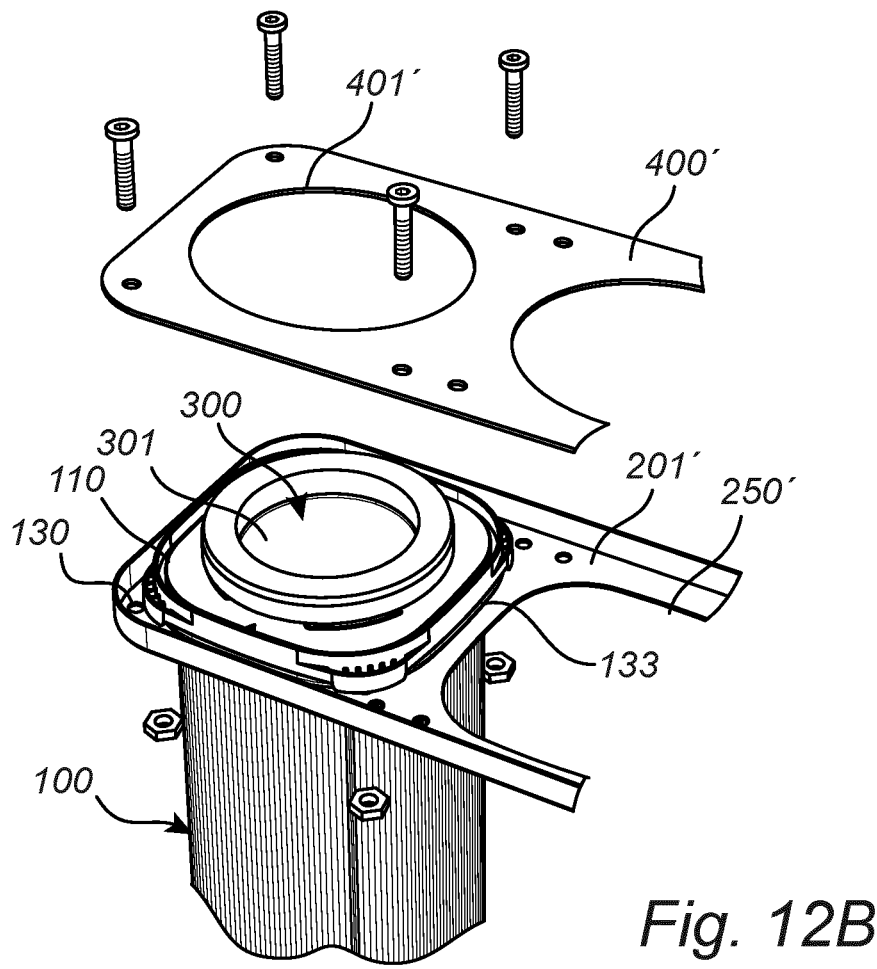
Figure 12C:
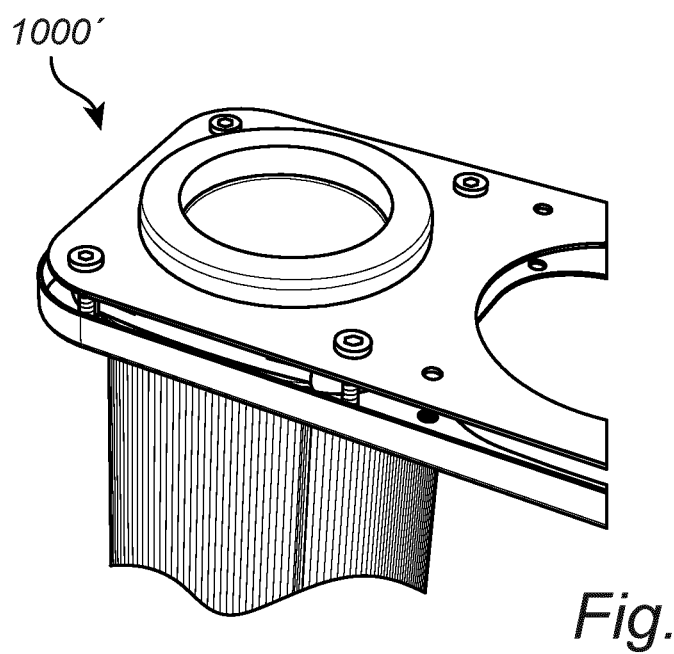

Now turning to FIGS. 12A-12C, a second way of mounting a tubular filter arrangement 1000 to a filter support 201' is schematically disclosed.

As a major difference to the first embodiment, the locking member 303 of the tubular air pulse distributor 300 is not used to mount the tubular filter arrangement 1000 to the filter support 201'. Instead, the locking member 303 is only used to connect the tubular air pulse distributor 300 to the tubular filter element 100. The resulting tubular filter arrangement 1000 is configured to be mounted to the filter support 201' in a manner to be described below.

During mounting the tubular filter element 100 is arranged in a vertical position resting on e.g. the floor on top of the filter support 201'. The filter support 201' is then moved along the tubular filter element 100 into abutment with the lower surface 130 of the support member 110 and the second sealing member 133 supported thereby. The sealing member 133 may be integral with either the support member 110 or the filter support 201', or even be a separate member. The through going hole 250' in the filter support 201' hence has a cross section that exceeds the cross section of the tubular filer element 100. It is however to be understood that the cross sections must not be complementary.

To fixate the filter support 201' in view of the tubular filter element 100, a frame element 400' is mounted from above and bolted to the filter support 201'. The frame element 400' comprises a through-going opening 401' with a cross section corresponding to or exceeding the cross section of the tube 301 of the tubular air pulse distributor 300. The frame element 400' may abut either the upper surface of the support member 110 or the shoulder 310 and/or the locking member 303 of the tubular air pulse distributor 300. In its mounted position, the tubular filter arrangement 1000 will be suspended by being fixedly mounted to the filter support 201'.

It is to be understood that the tubular filter arrangement 1000 may be fixated to the filter support 201' in a number of ways with remained function. In a non-disclosed embodiment, the frame element 400' may by way of example be replaced by one or more clamps configured to act between the filter support and a portion of the tubular filter arrangement which extends through the opening in the filter support. In yet another non-disclosed embodiment, the tubular filter arranged may be bolted to the filter support 201' by bolts extending through the support member 110 and the filter support 201.

FIG. 12A discloses an embodiment of a filter support 201' which is designed to receive four filter arrangements. It is to be understood that the number of filter arrangements may differ depending on the size and design of the filter box 1.

Although not explicitly disclosed in the application, the skilled person will understand that each wall portion in the first and second sets of two opposing wall portions, with remained function may have a substantially flat extension. The substantially flat extension may be provided by each wall portion having an infinitely large radius R2.

The invention claimed is:

1. A tubular filter arrangement comprising a tubular filter element and a tubular air pulse distributor,
    the tubular filter element comprising a tubular pleated filter media, and a cage structure having a longitudinal extension and which along an exterior envelope surface thereof is arranged to support the pleated filter media, wherein the cage structure as seen in a cross-section transverse to the longitudinal extension thereof comprises an inner envelope surface which defines an inner flow channel of the tubular filter element;
        wherein the exterior envelope surface of the cage structure, as seen in a cross-section transverse to the longitudinal extension, defines a first set of two opposing wall portions and a second set of two opposing wall portions, and
        wherein a first opposing wall portion of the first set of two opposing wall portions merges with the two opposing wall portions of the second set of two opposing wall portions via a respective corner portion,
        wherein a second opposing wall portion of the first set of two opposing wall portions also merges with the two wall opposing portions of the second set of two opposing wall portions via a respective corner portion,
        wherein each opposing wall portion in the first and second sets of two opposing wall portions has a radius exceeding a radius of the respective corner portions, or has a flat extension, and
        wherein in a condition when the pleated filter media is arranged to encircle the exterior envelope surface of the cage structure, an inner wall of the pleated filter media is elastically deformed to conform to the exterior envelope surface of the cage structure, whereby the inner wall of the pleated filter media abuts the first and second sets of two opposing wall portions of the cage structure;
    the tubular air pulse distributor comprising a locking member and a cylindrical tube having an exterior longitudinal wall portion extending between a first end of the tube defining an inlet opening and a second end of the tube defining an outlet opening, the tube defining a clearance gap with the cage, the clearance gap varying in size about the circumference of the tube, the tube configured to transmit pulses of air longitudinally into the cage structure and then out through the cage structure causing the pleated filter element to vibrate relative to the cage structure,
    wherein the locking member is configured to allow the tubular air pulse distributor to lockingly engage the tubular filter element with the tube being received inside the inner flow channel of the tubular filter element,
    wherein the tubular filter element adjacent an entry opening thereof comprises a radially extending support member, and wherein the locking member of the tubular air pulse distributor is configured to lockingly engage the support member of the tubular filter element; and
    wherein the support member comprises a longitudinally extending neck portion comprising a locking means configured to lockingly engage a complementary locking means arranged on the tubular air pulse distributor.

2. A tubular filter arrangement, comprising a tubular filter element and a tubular air pulse distributor,
    the tubular filter element comprising a tubular pleated filter media and a cage structure having a longitudinal extension and which along an exterior envelope surface thereof is arranged to support the pleated filter media, wherein the cage structure as seen in a cross-section transverse to the longitudinal extension thereof comprises an inner envelope surface which defines an inner flow channel of the tubular filter element;
        wherein the exterior envelope surface of the cage structure, as seen in a cross-section transverse to the longitudinal extension, defines a first set of two opposing wall portions and a second set of two opposing wall portions,
        wherein a first opposing wall portion of the first set of two opposing wall portions merges with the two opposing wall portions of the second set of two opposing wall portions via a respective corner portion,
        wherein a second opposing wall portion of the first set of two opposing wall portions merges with the two wall opposing portions of the second set of two opposing wall portions via a respective corner portion,
        wherein each opposing wall portion of the first and second sets of two opposing wall portions has a radius exceeding a radius of the respective corner portions, or has a flat extension, and wherein in a condition when the pleated filter media is arranged to encircle the exterior envelope surface of the cage structure, an inner wall of the pleated filter media is elastically deformed to conform to the exterior envelope surface of the cage structure, whereby the inner wall of the pleated filter media abuts the first and second sets of two opposing wall portions of the cage structure;

the tubular air pulse distributor comprising a locking member and a tube having an exterior longitudinal wall portion extending between a first end of the tube defining an inlet opening and a second end of the tube defining an outlet opening;

wherein the locking member is configured to allow the tubular air pulse distributor to lockingly engage the tubular filter element with the tube being received inside the inner flow channel of the tubular filter element, wherein the tubular filter element adjacent an entry opening thereof comprises a radially extending support member, and wherein the locking member of the tubular air pulse distributor is configured to lockingly engage the support member of the tubular filter element; and wherein the support member comprises a longitudinally extending neck portion comprising a locking means configured to lockingly engage a complementary locking means arranged on the tubular air pulse distributor.

3. A tubular filter arrangement according to claim 2, wherein each opposing wall portion of the first and second sets of two opposing wall portions of the cage structure have a radius exceeding a radius of the pleated filter media as seen in a condition before elastic deformation of the pleated filter media.

4. A tubular filter arrangement according to claim 2, wherein, in a condition when the tube of the air pulse distributor is received inside the cage structure, first variable width gaps are formed along the corner portions of the cage structure, as seen in a direction transverse to the longitudinal extension, between the exterior wall of the tube of the air pulse distributor and the corner portions of the cage structure, the first variable width gaps extending as longitudinally extending interspaces along the full length of the tube of the air pulse distributor.

5. A tubular filter arrangement according to claim 4, wherein, in a condition when the tube of the tubular air pulse distributor is inserted into the inner flow channel of the tubular filter element, second variable width gaps are formed, as seen in a direction transverse to the longitudinal extension, between the exterior wall of the tube of the air pulse distributor and the first set of two opposing wall portions and the second set of two opposing wall portions of the cage structure, wherein the first variable width gaps are wider than the second variable width gaps.

6. A tubular filter arrangement according to claim 2, wherein the locking member is integral with the tubular air pulse distributor.

7. A tubular filter arrangement according to claim 2, wherein the tubular filter arrangement is configured to be mounted to a filter support in a filter box.

8. A tubular filter arrangement according to claim 2 further comprising a sealing member configured to be arranged in an interface between the support member of the tubular filter element and a filter support.

9. A tubular filter arrangement according to claim 2, wherein the tubular filter arrangement is configured to be mounted in a filter box.

10. A tubular filter arrangement according to claim 2, wherein the pleated filter media has a uniform pleat height.

11. A tubular filter arrangement according to claim 2, wherein a gap between the tube and the cage is larger at the corners of the cage than along the opposing wall portions of the first and second set of two opposing wall portions.

12. A tubular filter arrangement, comprising a tubular filter element and a tubular air pulse distributor, the tubular filter element comprising a tubular pleated filter media and a cage structure having a longitudinal extension and which along an exterior envelope surface thereof is arranged to support the pleated filter media, wherein the cage structure as seen in a cross-section transverse to the longitudinal extension thereof comprises an inner envelope surface which defines an inner flow channel of the tubular filter element;

wherein the exterior envelope surface of the cage structure, as seen in a cross-section transverse to the longitudinal extension, defines a first set of two opposing wall portions and a second set of two opposing wall portions, wherein a first opposing wall portion of the first set of two opposing wall portions merges with the two opposing wall portions of the second set of two opposing wall portions via a respective corner portion, wherein a second opposing wall portion of the first set of two opposing wall portions merges with the two wall portions of the second set of two opposing wall portions via a respective corner portion, wherein each opposing wall portion of the first and second sets of two opposing wall portions has a radius exceeding a radius of the respective corner portions, or has a flat extension, and wherein in a condition when the pleated filter media is arranged to encircle the exterior envelope surface of the cage structure, an inner wall of the pleated filter media is elastically deformed to conform to the exterior envelope surface of the cage structure, whereby the inner wall of the pleated filter media abuts the first and second sets of two opposing wall portions of the cage structure;

the tubular air pulse distributor comprising a locking member and a tube having an exterior longitudinal wall portion extending between a first end of the tube defining an inlet opening and a second end of the tube defining an outlet opening;

wherein the locking member is configured to allow the tubular air pulse distributor to lockingly engage the tubular filter element with the tube being received inside the inner flow channel of the tubular filter element;

wherein the tubular filter element adjacent an entry opening thereof comprises a radially extending support member, and wherein the locking member of the tubular air pulse distributor is configured to lockingly engage the support member of the tubular filter element;

wherein the tubular filter arrangement is configured to be mounted in a filter box; and wherein the support member of the tubular filter element comprises a neck portion having a non-rotational symmetric longitudinal extension configured to extend through a complementary through-going hole in the filter support in the filter box.

* * * * *